United States Patent [19]

Le Goff et al.

[11] 4,375,685

[45] Mar. 1, 1983

[54] GAS LASER ASSEMBLY WHICH IS CAPABLE OF EMITTING STABILIZED FREQUENCY PULSE RADIATIONS

[75] Inventors: Denis Le Goff, St Cyr L'Ecole; Jean C. Guyot, Cernay la Ville, both of France

[73] Assignee: Compagnie Generale D'Electricite, Paris, France

[21] Appl. No.: 183,494

[22] Filed: Sep. 2, 1980

[30] Foreign Application Priority Data

Aug. 31, 1979 [FR] France ................................ 79 21881

[51] Int. Cl.³ .............................................. H01S 3/13
[52] U.S. Cl. ..................................................... 372/32
[58] Field of Search ...................... 372/32, 29, 28, 20, 372/95, 92, 55

[56] References Cited

U.S. PATENT DOCUMENTS 3,437,955  4/1969  Enloe et al. .

*Primary Examiner*—William L. Sikes
*Assistant Examiner*—Léon Scott, Jr.
*Attorney, Agent, or Firm*—Sughrue, Mion, Zinn, Macpeak and Seas

[57] ABSTRACT

The invention relates to a gas laser assembly which is capable of emitting stabilized frequency pulse radiation. Said arrangement includes a first continuous gas laser generator and a second pulse gas laser generator, an optical system (19, 56, 20) to inject the continuous beam (18) emitted by the first laser generator via the optical cavity (8-9) of the second laser generator and a servo control circuit (21,23,24,25) acting in synchronism on the length of the cavities (5-6,8-9) of the first and second lasers, so as to keep these lengths equal at a fixed value. Application to range finders operating by heterodyne detection.

7 Claims, 5 Drawing Figures

GAS LASER ASSEMBLY WHICH IS CAPABLE OF EMITTING STABILIZED FREQUENCY PULSE RADIATIONS

FIELD OF THE INVENTION

The present invention relates to a gaz laser assembly which is capable of emitting pulses of radiation at a stabilized frequency.

BACKGROUND OF THE INVENTION

It is known that to stabilize the frequency of the radiation of a gas laser which operates as a pulse laser, a master laser is generally used, said master laser delivering a continuous beam of substantially identical frequency.

A laser assembly of the above type is described in the technical article entitled "Simultaneous frequency stabilization and injection in a TEA-$CO_2$ oscillator" by J. L. Lachambre et al, which appeared in the U.S. journal "Applied Optics", vol. 17, No. 7 of Apr. 1, 1978, pages 1015 to 1017. The assembly includes two gas lasers, a first laser which emits a continuous beam and a second laser which delivers pulses. In each of these lasers, one of the mirrors of the optical cavity is fixed on a piezoelectric component so as to make the length of the cavity and hence the frequency of the laser radiation vary when a suitable bias voltage is applied to the electrodes of said component. The continuous beam emitted by the first laser is injected into the second laser via an optical system which includes a quarter-wave plate and a polarizer. A first servo-control circuit which operates by biasing the electrodes of the piezoelectric component of the first laser serves to stabilize the frequency of the continuous beam. A detector circuit placed at the output of the second laser delivers a signal which is representative of the fraction of the continuous beam which has passed through said laser. A second servo-control circuit which receives said signal delivers a voltage which is applied on the electrodes of the piezoelectric component of the second laser so as to stabilize the frequency of the pulse radiation of said second laser.

Said assembly has the disadvantage of being complicated since it requires two servo-control circuits. Further, operational instability and saturation of the detector circuit are often observed.

Preferred embodiments of the present invention mitigate these disadvantages.

SUMMARY OF THE INVENTION

The present invention provides a gas laser assembly which is capable of emitting frequency stabilized pulse radiation. The said arrangement includes:

a first gas laser generator which includes two reflectors disposed to form a first optical resonant cavity. One of the two reflectors is fixed on a first piezoelectric component made of a piezoelectric substance and provided with electrodes so as to cause the length of the cavity to vary by applying a variable voltage to said electrodes, one of the reflectors being partially transparent.

A first active gas is disposed inside the first cavity and means are provided for exciting the first active gas to obtain a continuous laser beam which passes through the partially transparent reflector.

The arrangement further includes a second gas laser generator which includes two reflectors disposed to form a second optical resonant cavity. One of these reflectors is fixed on a second piezoelectric component made of a piezoelectric substance and provided with electrodes so as to cause the length of the cavity to vary by applying a variable voltage to said electrodes, both reflectors of the second gas laser generator being partially transparent.

A second active gas is disposed inside the second optical resonant cavity; and the second gas laser generation includes pulses of said radiation which pass through one of the reflectors of the second cavity.

Further, there are means for making at least part of the energy of the continuous laser beam pass through the second cavity, means for applying a biassing voltage to the electrodes of the first piezoelectric component so as to keep the frequency of the continuous laser beam constant and means for applying a biassing voltage to the electrodes of the second piezoelectric component so as to stabilize the frequency of said radiation.

The gas laser assembly further includes a support formed by a single piece of homogenous substance. The support includes two plane surfaces which are parallel to each other and on which are fixed firstly the first and second piezoelectric component which are respectively integral with two reflectors of said first and second cavities and secondly the other reflectors of said cavities. The first and second piezoelectric components are identical to each other so that the length of the first cavity is equal to that of the second cavity.

Further, the means for applying a bias voltage on the electrodes of the second piezoelectric component are means for connecting the electrodes of the first piezoelectric component in parallel with those of the second piezoelectric component.

A particular form of embodiment of the present invention is described hereinbelow by way of an example with reference to the accompanying drawings.

DESCRIPTION OF THE PREFERRED EMBODIMENT

Figure 1:
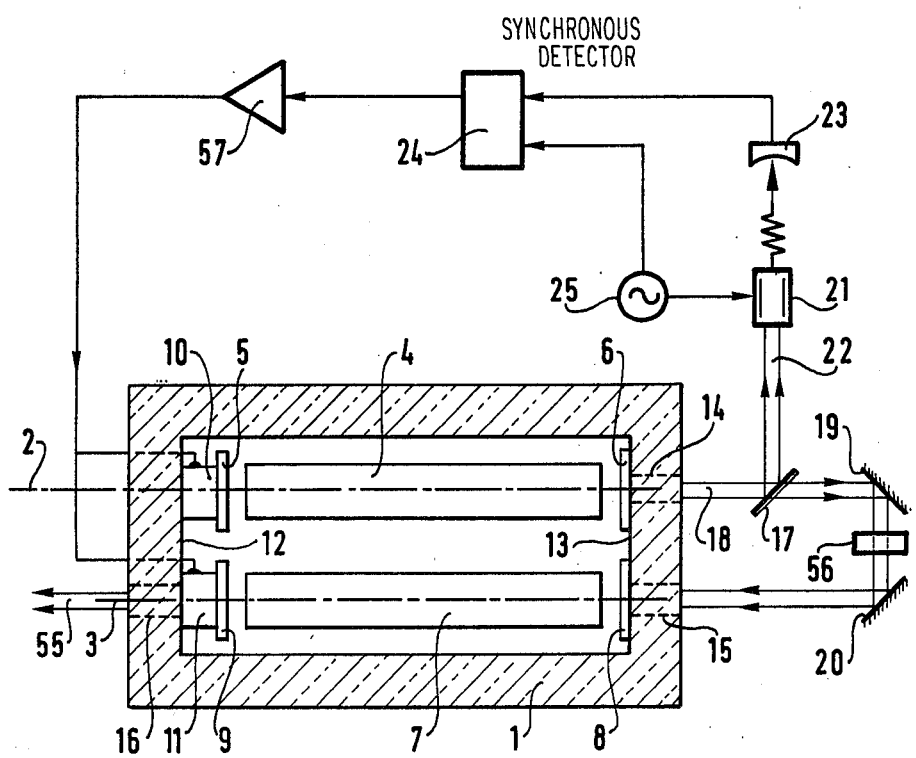
FIG. 1 schematically illustrates an embodiment of a laser assembly in accordance with the invention.

FIG. 1 illustrates an assembly which principally includes two laser generators installed on a support 1 along respective axes 2 and 3 which are parallel to each other. The continuous emission laser generator, whose axis is 2, includes a gas tube 4 disposed inside an optical resonant cavity formed by two parallel mirrors 5 and 6. The mirror 5 is a totally reflecting mirror and the mirror 6 is partially transparent so as to pass the continuous output beam. The laser generator whose axis is 3 and which delivers pulses includes a gas tube 7 disposed inside an optical resonant cavity formed by two parallel mirrors 8 and 9 which are both partially transparent.

The mirrors 5 and 9 are each fixed to the ends of respective stacks 10 and 11 of piezoelectric ceramic rings separated by electrodes. The bases of the stacks 10 and 11 are fixed on a plane surface 12 of the support 1. The mirrors 6 and 8 are fixed directly on another plane surface 13 of the support 1, the surfaces 12 and 13 being adjacent and parallel to each other. As shown in the figure, the length of the cavity of the laser whose axis is 2 (i.e. the distance between the mirrors 5 and 6) is equal to that of the cavity 8-9 of the laser whose axis is 3. Likewise, the stacks 10 and 11 have the same length and are made of the same piezoelectric substance; preferably, the mirrors 5, 6, 8 and 9 all have the same thickness.

The support 1 is made in a single block of homogenous material whose coefficient of expansion is low. For example, it may be made of silica or of nickel steel. The support may have a generally rectangular shape as shown in FIG. 1, the mirrors and stacks being fixed on the small sides of the rectangle. Of course, the support includes openings such as 14, 15 and 16 to pass the laser beams.

The arrangement illustrated in FIG. 1 further includes an optical system which includes a semi-transparent mirror 17 that divides the continuous laser beam 18 emerging from the laser generator whose axis is 2 into two parts. The part of the beam 18 which passes through the mirror 17 is injected along the axis 3 via the optical cavity 8-9 after being reflected on the reflecting mirrors 19 and 20 and passing through an optical decoupling system 56. The system 56 may be constituted by the quarterwave plate associated with a polarizer, as in the device described in the above-mentioned American article.

Lastly, the arrangement illustrated in FIG. 1 includes a servo-control system which includes an electro-optical modulator 21 such as a Stark cell which receives the portion 22 of the beam 18 reflected by the mirror 17. The output of the modulator 21 is coupled to a detector 23. A synchronous detector 24 includes two inputs connected respectively to the output of the detector 23 and to the output of a generator 25 for generating an alternating reference current, also connected to the modulator 21. The output of the detector 24 is connected via an amplifier 57 to the electrodes of the stacks 10 and 11 of piezoelectric ceramic parts. The electrodes of both stacks 10 and 11 are thus connected in parallel in the loop of the servo-control system, the various electrodes of the same stack possibly also being connected together in parallel.

Figure 2:
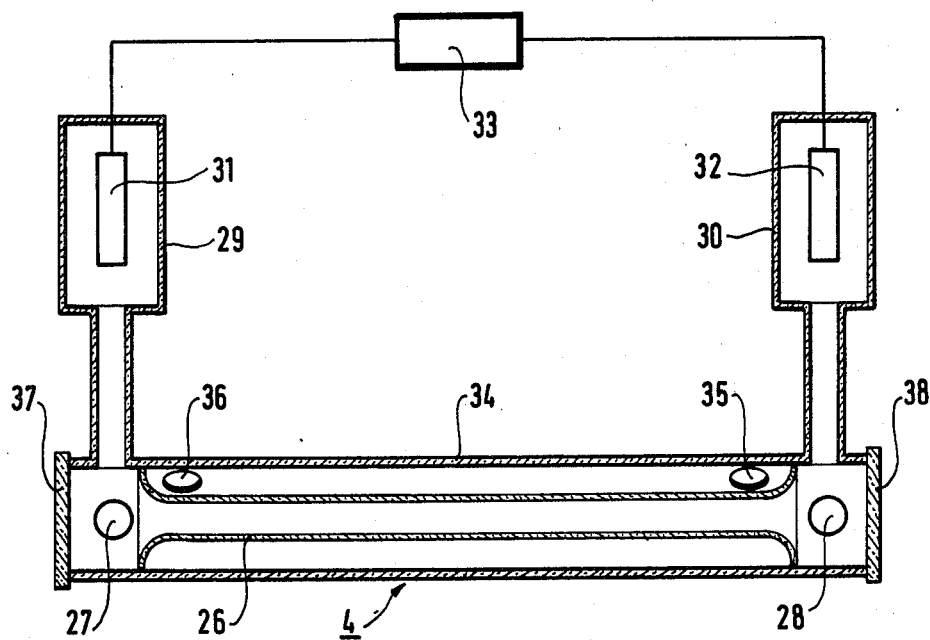
FIG. 2 is a cross-section of the gas tube of a continuous laser generator which forms a part of the assembly illustrated in FIG. 1.

FIG. 2 illustrates in greater detail the laser tube 4 illustrated in FIG. 1. The laser tube 4 includes a glass tube 26 whose ends are connected to two side openings 27 and 28 to allow the active laser gas to circulate, said gas being constituted by a mixture of helium, carbon dioxide and nitrogen at a pressure of about ten torr. Two side extensions 29 and 30 of the tube 26 contain electrodes 31 and 32 connected respectively to the output terminals of a high-tension current-stabilized DC electric power source 33. A sleeve 34 is disposed round the tube 26 to allow a cooling liquid such as water to circulate between two openings 35 and 36. The ends of the tube 26 are closed by two transparent windows 37 and 38.

Figure 3:
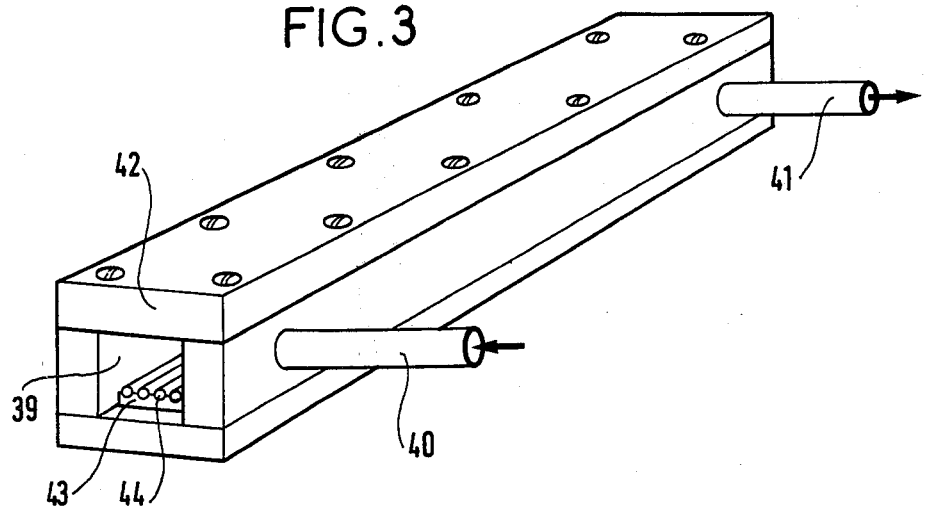
FIG. 3 is a perspective view of the gas circulation duct of a laser pulse generator, said generator forming part of the assembly illustrated in FIG. 1.

FIG. 3 illustrates a duct 39 of rectangular cross-section in which there flows the active gas of the pulse laser whose axis is 3, illustrated in FIG. 1. Said active gas contains the same gases as that of a continuous laser, i.e. a mixture of helium, carbon dioxide and nitrogen. It circulates at atmospheric pressure between an inlet 40 and an outlet 41 disposed laterally on the duct 39 one of whose surfaces is constituted by the anode 42. The cathode 43 is disposed in the duct on the opposite surface of the duct. Insulated conductor wires 44 are inserted in the cathode 43. The duct 39 is closed at its ends by two transparent windows (not shown) to constitute the tube 7 shown in FIG. 1.

Figure 4:
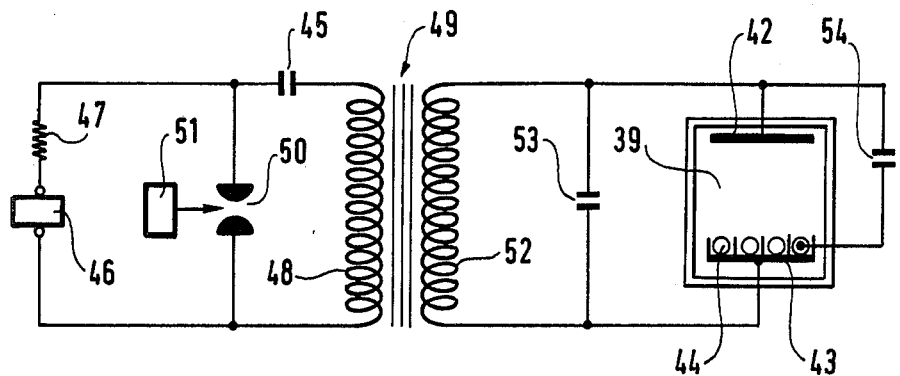
FIG. 4 is a diagram of the electricity supply circuit of the laser illustrated in FIG. 3.

FIG. 4 is a diagram of the electrical supply circuit for the electrodes 42 and 43 and for the conductor wires 44 shown in FIG. 3. Said circuit includes a capacitor 45 charged by a high-tension source 46 via a resistor 47 in series with the primary winding 48 of a transformer 49. A switch 50 connected in parallel to the circuit branch formed by the capacitor 45 and the winding 48 may advantageously be constituted by a discharger whose terminals may be short-circuited for example by an electric pulse coming from a pulse generator 51. The outputs of the secondary winding 52 of the transformer 49 are connected respectively to the plates of a capacitor 53, these plates also being connected respectively to the anode 42 and to the cathode 43. The conductor wires 44 are connected to the anode 42 via a capacitor 54.

The arrangement described hereinabove and illustrated in FIGS. 1 to 4 operates as follows.

Figure 5:
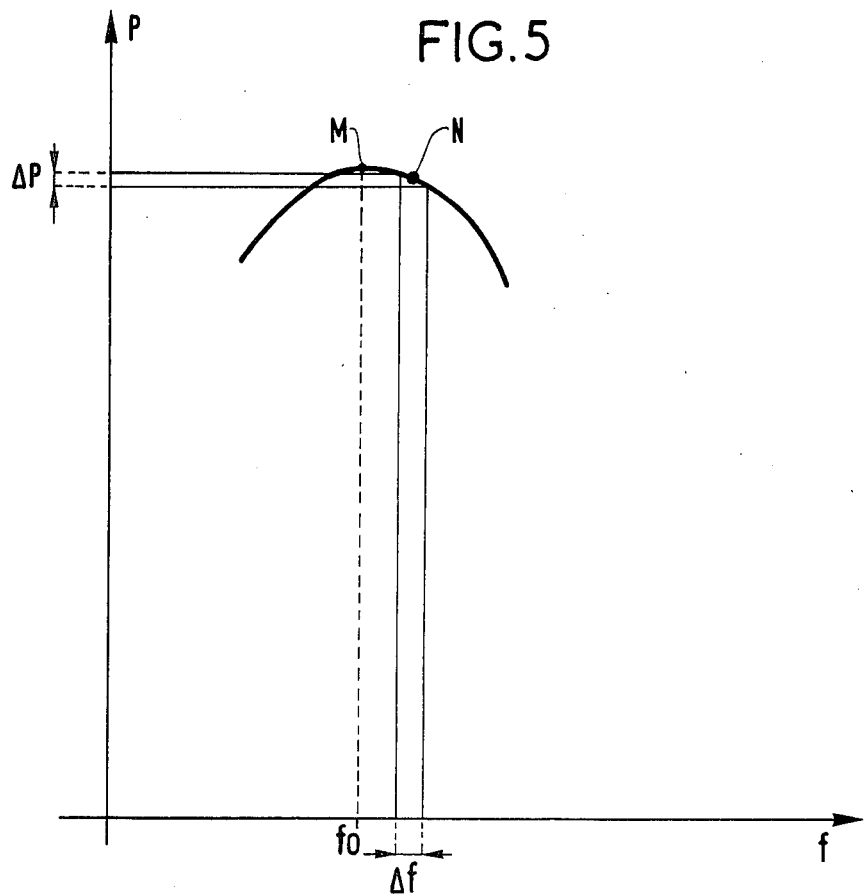
FIG. 5 is a graph of power versus frequency illustrating the principle of the frequency of the continuous laser generator.

The laser generator is started up as soon as the source 33 is connected to the electrodes 31 and 32 and as soon as the active gas circulates in the tube 26. The power of the portion 22 of the continuous laser 18 is modulated by the modulator 21 at the frequency delivered by the reference generator 25. FIG. 5 is a graph which indicates the variation in power P of the continuous laser as a function of its emission frequency f which itself depends on the length of the cavity 5-6. At point N of said graph, the modulation $\Delta f$ of amplitude equal to the frequency of the reference generator 25 corresponds to a modulation $\Delta P$ of the laser power. Since said curve passes through a maximum M which corresponds to a frequency fo, the value of $\Delta P$ decreases as N comes closer to M. The servo-control circuit illustrated in FIG. 1 allows the length of the cavity 5-6 to be adjusted so that the emission frequency of the laser is equal to the fixed value fo.

For that purpose, the alternating modulation signal whose maximum amplitude is $\Delta P$ is compared with the reference signal $\Delta f$ by the synchronous detector 24 whose output delivers a signal whose absolute value and sign are representative of the phase difference between the modulation signal $\Delta P$ and the reference signal. After amplification by the unit 25, the output signal of the detector 24 is applied to the electrodes of the piezoelectric component 10. This results in a variation in the length of the cavity 5-6 in the direction which tends to reduce the phase difference. When said difference is zero, the frequency of the continuous laser is equal to fo.

The switch 50 is turned on so as to discharge the previously charged capacitor 45 into the primary winding 48 of the transformer 49 as described hereinabove. The capacitor 53 is charged until the voltage at its plates is sufficiently high to trigger a discharge in the duct 39 between the anode 42 and the cathode 49, a current of active gas flowing through said duct. The discharge is made more homogenous by the conductors 44 brought to the potential of the anode. In the example described, said discharge is perpendicular to the axis of emission 3 of the pulse emitted by the laser.

The radiation 55 which leaves the mirror 9 therefore results from superposing firstly the pulse radiation emitted by the active gas contained in the tube 7 and secondly the continuous radiation emitted by the active gas contained in the tube 4. Said radiation enters the cavity 8-9 via the system 56 to prevent the pulses emitted in the cavity 8-9 from being injected in the continuous emission laser.

It is obvious that the power of the continuous radiation is absolutely negligible with respect to that of the pulse radiation.

Injection of the continuous beam into the cavity 8-9 allows the frequency of the pulse radiation to be stabilized, the frequency of the continuous beam being stabilized by the servo-control circuit as seen hereinabove.

For the frequency of the radiation emitted by the pulse laser to be effectively stabilized, the length of the two cavities 5-6 and 8-9 must be equal, at all times, to a fixed value.

This is ensured by fixing these two cavities on the support 1 formed by a single piece of homogenous substance whose coefficient of expansion is low. The small variations in length of the cavities due, for example, to fluctuations in temperature, are compensated by means of the servo-control circuit which affects both cavities in an identical manner since the electrodes of both piezoelectric components 10 and 11 are connected in parallel.

The laser arrangement in accordance with the present invention may be applied to producing range finders which operate on the heterodyne principle detection.

We claim:

1. A gas laser assembly which is capable of emitting frequency stabilized pulse radiation, said assembly including:
    a first gas laser generator comprising two reflectors disposed to form a first optical resonant cavity, a first piezoelectric component provided with electrodes so as to cause the length of the cavity to vary by applying a variable voltage to said electrodes, one of said two reflectors being fixed on said first piezoelectric component, one of said reflectors being partially transparent; a first active gas disposed inside the first cavity; and means for exciting the first active gas to obtain a continuous laser beam which passes through the partially transparent reflector;
    a second gas laser generator comprising two reflectors disposed to form a second optical resonant cavity, a second piezoelectric component made of a piezoelectric substance provided with electrodes so as to cause the length of the cavity to vary by applying a variable voltage to said electrodes, one of said two second gas laser generator reflectors being fixed on said second piezoelectric component, both reflectors of the second gas laser generator being partially transparent; a second active gas disposed inside the second optical resonant cavity; and means for exciting the second active gas to obtain pulse radiation which passes through the reflectors of the second cavity;
    means for causing at least part of the energy of the continuous laser beam to pass through the second cavity;
    means for applying a biasing voltage to the electrodes of the first piezoelectric component so as to keep the frequency of the continuous laser beam constant; and
    means for applying a biasing voltage to the electrodes of the second piezoelectric component so as to stabilize the frequency of said pulse radiation; and
    wherein the gas laser assembly further includes a support formed by a single block of homogenous solid material whose coefficient of expansion is low, said support including two plane surfaces which are parallel to each other and on which are fixed firstly the first and second piezoelectric components which are respectively integral with two reflectors of said first and second cavities and secondly the other reflectors of said cavities, the first and second piezoelectric components being identical to each other so that the length of the first cavity is equal to that of the second cavity; and
    wherein said means for applying a bias voltage on the electrodes of the second piezoelectric component comprise means for connecting the electrodes of the first piezoelectric component in parallel with those of the second piezoelectric component.

2. A gas laser assembly according to claim 1, wherein the means for applying a bias voltage on the electrodes of the first piezoelectric component include:
    a reference generator which generates an AC voltage of constant frequency;
    an electro-optical modulator connected to the output of the reference generator and receiving also the energy of the continuous laser beam;
    a detector for detecting the AC signal which modulates the output voltage of the modulator; and
    a synchronous detector connected to the outputs of the reference generator and of the detector respectively, said synchronous detector being capable of delivering a voltage whose amplitude and sign are representative respectively of the amplitude and of the sign of the phase difference between the output signal of the detector and the reference voltage, the output of the synchronous detector being connected to the electrodes of the first piezoelectric component via an amplifier.

3. A gas laser assembly according to claim 1, wherein the substance of which the support is made is silica.

4. A gas laser assembly according to claim 1, wherein the substance of which the support is made is nickel steel.

5. A gas laser assembly according to claim 1, wherein the first active gas and the second active gas are the same.

6. A gas laser assembly according to claim 1, wherein the second active gas is at atmospheric pressure and wherein said means of exciting the second active gas includes means for setting up a magnetic field substantially perpendicular to the axis of emission of the second laser generator.

7. A gas laser assembly according to claim 1, wherein said means of making at least part of the energy of the continuous laser beam pass into the second cavity include an optical decoupling system including means for preventing the pulses emitted in the second cavity from being injected into the first cavity.

* * * * *